United States Patent
Kleinschmit et al.

[11] Patent Number: 5,944,440
[45] Date of Patent: Aug. 31, 1999

[54] CHASSIS SUPPORT AND PROCESS FOR MANUFACTURE THEREOF

[75] Inventors: Einhard Kleinschmit; Peter Tattermusch; Harald Reimold, all of Esslingen, Germany

[73] Assignee: Mercedes-Benz AG, Germany

[21] Appl. No.: 08/798,503

[22] Filed: Feb. 10, 1997

[30] Foreign Application Priority Data

Feb. 10, 1996 [DE] Germany ............... 196 04 942

[51] Int. Cl.$^6$ .................................................. F16B 11/00
[52] U.S. Cl. ................... 403/271; 403/404; 296/203.01
[58] Field of Search ..................... 403/270, 271, 403/272, 404, 265; 296/204, 205, 29, 203.01; 29/525, 525.01; 219/121

[56] References Cited

U.S. PATENT DOCUMENTS

| | | | |
|---|---|---|---|
| 2,226,790 | 12/1940 | Valletta | 296/204 |
| 3,105,701 | 10/1963 | Schilberg. | |
| 4,840,424 | 6/1989 | Asoh | 296/204 |
| 4,986,597 | 1/1991 | Clausen | 296/205 |
| 5,370,438 | 12/1994 | Mori et al. | 296/204 X |
| 5,549,352 | 8/1996 | Janotik et al. | 296/205 X |
| 5,609,386 | 3/1997 | Takahashi et al. | 296/204 |
| 5,653,495 | 8/1997 | Bovellan et al. | 296/204 X |

FOREIGN PATENT DOCUMENTS

| | | |
|---|---|---|
| 0 548 859 B1 | 12/1992 | European Pat. Off. . |
| 713 39 625 | 11/1976 | Germany . |
| 61-186682 | 11/1986 | Japan . |
| 4-65736 | 10/1992 | Japan . |
| 5-124538 | 5/1993 | Japan . |
| 6-1130 | 6/1994 | Japan . |

*Primary Examiner*—Harry C. Kim
*Attorney, Agent, or Firm*—Evenson, McKeown, Edwards & Lenahan, P.L.L.C.

[57] ABSTRACT

A box-shaped chassis support for use in a passenger vehicle is comprised of a top shell and a bottom shell. Each shell is produced from an aluminum sheet consisting of self-hardening aluminum alloy. The shells are welded to one another in the region of their mutually adjoining section legs along the hollow support profile.

5 Claims, 1 Drawing Sheet

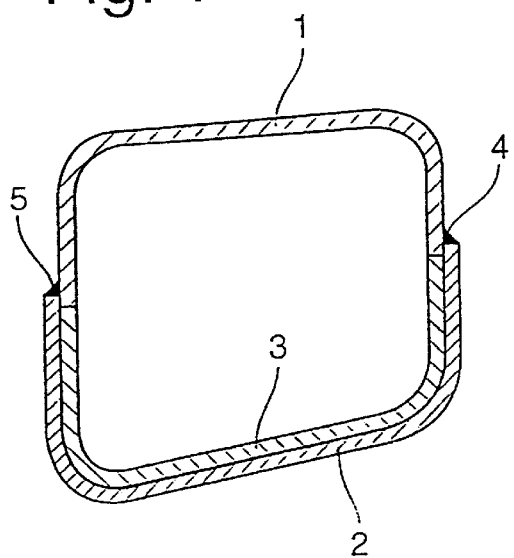
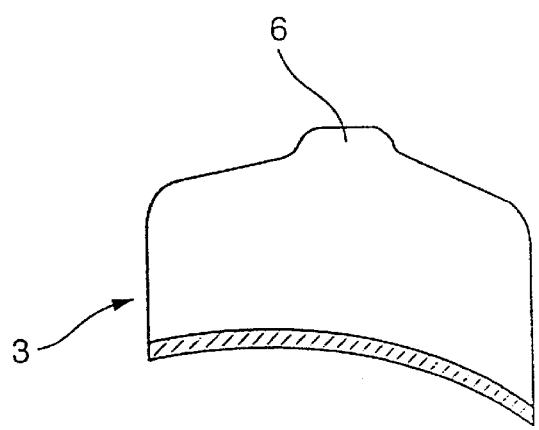

CHASSIS SUPPORT AND PROCESS FOR MANUFACTURE THEREOF

BACKGROUND AND SUMMARY OF THE INVENTION

The present invention relates to a chassis support having a hollow support section consisting of a self-hardening aluminum alloy as well to a process for manufacturing the support.

EP 0 548 859 B1 discloses a process for the manufacture of chassis supports in which the chassis supports are produced from straight-bead welded tubes made of a self-hardening aluminum alloy. Such a tube is produced from a sheet metal plate made of an AlMgMn-alloy. The sheet metal plate is correspondingly longitudinally curved and welded along the forming straight bead. These straight-bead welded tubes are then cold-formed by internal high-pressure metal forming and are previously intermediately annealed. With this forming technique, the adaptation of the cross-sections of the chassis support to the respective local stresses is,. however, possible only to a limited extent.

It is an object of the present invention to provide a chassis support which has a weight which is as low as possible while the operating stability is simultaneously very high over its entire length.

This object has been achieved in accordance with the present invention that the hollow support section comprises a box-type manner of a top shell and a bottom shell which are each made of an aluminum sheet consisting of the self-hardening aluminum alloy. The top shell and the bottom shell are each welded together on the longitudinal side in the region of their mutually adjoining section legs. As a result of this construction, large abrupt changes of cross-section as well as sudden transitions for the chassis support can be provided. Local reinforcements or nodes can be mounted on the interior side of these box sections. This arrangement considerably reduces the weight of the chassis support, particularly because corresponding section moduli of the chassis support can be coordinated in a targeted manner with the respective local stress. One advantage of the present invention is that the chassis support has a very low weight while its stability is simultaneously excellent.

According to a further feature of the present invention, the longitudinally extending weld seams are displaced in low-stress regions of the box-shaped hollow support section. As a result, the stability drop in the weld seam region does not have any significant effect on the operating stability of the chassis support.

Yet a further advantageous feature of the present invention resides in the provision of reinforcing devices for highly stressed regions of the hollow support section assigned to the top and bottom shells. These reinforcing devices are used in a targeted manner on the respective highly stressed regions of the chassis support.

Furthermore, several reinforcing sheets can be provided as reinforcing devices distributed along the length of the hollow support section. The reinforcing sheets can be, in the case of overlapping top and bottom shells, arranged inside the larger shell and have positioning noses on which the section legs of the other shell rest and the section legs of the outer shell simultaneously overlap those of the inner shell. As a result, one shell can be positioned with respect to the other shell for a subsequent welded connection.

BRIEF DESCRIPTION OF THE DRAWINGS

These and other objects, features and advantages will become more apparent from the following detailed description of the presently preferred embodiments when taken in conjunction with the accompanying drawings wherein:

FIG. 1 is a cross-sectional view of one embodiment of the chassis support according to the present invention; and FIG. 2 is an isolated partial lateral view of a reinforcing element for the chassis support according to FIG. 1.

DETAILED DESCRIPTION OF THE DRAWINGS

A chassis support 1 according to FIG. 1 has a box-shaped hollow support section which is formed of a top shell 1 and of a bottom shell 2. The top shell 1 as well as the bottom shell 2 are each produced from an aluminum sheet with a self-hardening AlMgMn-alloy and are formed while constructing in each case one shell bottom and two section legs extending along the length of the top shell 1 and the bottom shell 2.

The bottom shell 2 has a larger width than the top shell 1 so that the section legs of the bottom shell 2 is overlap the corresponding section legs of the top shell 1 on the outside. On the two opposite sides, the corresponding section legs of the top shell 1 and the bottom shell 2 are each welded to one another by a straight weld 4, 5.

In order to achieve for the welded connection of the top shell 1 and the bottom shell 2 a precise relative positioning of the two shells, specifically the top shell 1 and the bottom shell 2, with respect to one another, several reinforcing sheets 3 (FIGS. 1 and 2) are in addition inserted into the bottom shell 2 being distributed along the length of the chassis support and therefore along the length of the box-shaped hollow support section. The reinforcing sheets 3 are curved corresponding to the inside contour of the bottom shell 2 and rest flatly against the interior wall of the bottom shell 2.

In the region of its two lateral walls, each reinforcing sheet 3 has one positioning nose 6 (as seen in FIG. 2) respectively which project so far upwards that, in the inserted position of the reinforcing sheets 3, the nose 6 precisely defines the position of the top shell 1 with respect to the bottom shell 2. The lower edges of the section legs of the top shell 1 are butt-jointed to the upper edges of the positioning noses 6. In this position, the section legs of the bottom shell 2 overlap the section legs of the top shell 1 by a defined amount, as illustrated in FIG. 1, which is sufficient for being able to draw the weld seams 4 and 5.

The top shell 1 and the bottom shell 2 are formed corresponding to their future use as chassis supports, i.e., as a propeller shaft or drive shaft, as a cross member, as a frame or auxiliary frame, as a suspension link or the like. Whatever the use, the selected material experience an increase in stability as a result of the forming. By virtue of the configuration of the box-shaped hollow support profile of the chassis support as a combination of a top shell 1 and a bottom shell 2, the hollow support profile can also be configured with large abrupt changes of the cross-section and sudden transitions. Because of the overlapping welded connection, gaps which are to be bridged during the welding are independent of the trimming precision.

In addition to the reinforcing sheet 3, other types of reinforcements and nodes can also be provided on the interior side of the hollow support section and can be adapted in a targeted manner to the respective local stress and the resulting section moduli. As the result of the displacement of the weld seams 4, 5 in the region of the lateral walls of the box-shaped hollow support section, these weld seams are placed in low-stress regions, so that any stability drop in the weld seam regions has no significant effect on the operating stability of the overall construction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Chassis support having a box-shaped hollow support section, comprising a top shell with section legs, a bottom shell with section legs, the top shell and the bottom shell, in a region of the section legs thereof which mutually adjoin each other, being welded to each other on a longitudinal side such that one of the shells is an interior shell and the other of the shells is an exterior shell, and reinforcing devices assigned to highly stressed regions of a hollow support profile thereby, wherein the top shell and the bottom shell are made from aluminum sheet, respectively, consisting of a self-hardening aluminum alloy and are welded to one another in an overlapping manner, and the reinforcing devices comprising a plurality of reinforcing sheets arranged inside the exterior shell which are distributed along the length of the hollow support profile and have positioning noses on which end faces of the section legs of the interior shell are arranged to rest in a butt-jointed manner.

2. The chassis support according to claim 1, wherein the reinforcing sheets are curved so as to correspond to and rest flat on an inside contour of the exterior shell.

3. The chassis support according to claim 1, wherein the reinforcing devices comprise a cross-section of the hollow support section configured differently along a length thereof to adapt to local stresses.

4. The chassis support according to claim 3, wherein the reinforcing sheets are curved so as to correspond to and rest flat on an inside contour of the exterior shell.

5. A process for manufacturing a chassis support having a box-shaped hollow support section comprising a top shell and a bottom shell, comprising the steps of making the top shell and bottom shell with legs from a self hardening aluminum alloy sheet, welding the top shell and the bottom shell together in an overlapping manner in a region of adjoining legs which mutually adjoin each other, and assigning reinforcement to highly stressed regions of the hollow support section by arranging a plurality of reinforcing sheets inside one of the shells or along a length of the hollow support section with positioning noses for end faces of the other of the legs of the shells to rest upon in a butt-jointed manner, and configuring a cross-section of the hollow support section differently along the length of the hollow support section.

\* \* \* \* \*